United States Patent [19]

Meyer

[11] Patent Number: 4,878,111
[45] Date of Patent: Oct. 31, 1989

[54] PROCESS AND APPARATUS FOR THE PREPARATION OF PHOTOGRAPHIC IMAGES FROM TRANSPARENT MASTERS

[75] Inventor: Armin Meyer, Belfaux, Switzerland
[73] Assignee: Ciba-Geigy AG, Basel, Switzerland
[21] Appl. No.: 232,769
[22] Filed: Aug. 16, 1988
[30] Foreign Application Priority Data
Aug. 21, 1987 [CH] Switzerland ................ 3214/87
[51] Int. Cl.$^4$ .............................................. H04N 1/46
[52] U.S. Cl. ..................................... 358/75; 358/80; 355/20; 355/38
[58] Field of Search ................... 358/75, 80; 355/20, 355/38, 40

[56] References Cited

U.S. PATENT DOCUMENTS

| | | |
|---|---|---|
| 3,115,807 | 12/1963 | Craig et al. |
| 3,459,888 | 8/1969 | Sokolov |
| 3,934,081 | 1/1976 | Schumacher |
| 3,961,366 | 6/1976 | Weishaupt |
| 3,984,187 | 10/1976 | Festenreiner et al. |
| 4,344,699 | 8/1982 | McIntosh |
| 4,394,089 | 7/1983 | McIntosh et al. |
| 4,457,618 | 7/1984 | Plummer ........................... 355/20 |
| 4,492,457 | 1/1985 | Kawada et al. .................. 355/38 |
| 4,580,167 | 4/1986 | Diete |
| 4,628,350 | 12/1986 | Aughton et al. ................. 358/80 |
| 4,678,319 | 7/1987 | Reiterer ........................... 355/38 |
| 4,718,768 | 1/1988 | Houki et al. ..................... 358/75 |
| 4,764,793 | 8/1988 | Goll et al. ....................... 355/38 |
| 4,786,944 | 11/1988 | Sakamoto et al. ............... 355/20 |

FOREIGN PATENT DOCUMENTS

A453878 6/1968 Fed. Rep. of Germany.

OTHER PUBLICATIONS

The 2244 Research Disclosure No. 174.

Primary Examiner—Howard W. Britton
Assistant Examiner—Kim Yen Vu
Attorney, Agent, or Firm—Burns, Doane, Swecker & Mathis

[57] ABSTRACT

In a process and apparatus for the production of photographic images of transparent masters, the master is reproduced in a first beam path by means of a light source and optical means on photographic material, and in a second beam path for color and contrast correction by means of a CRT controlled by image measuring means and a computer unit as a mask in a coincident manner. The mask is produced by a feedback loop formed by the CRT, master, image measuring unit, computer unit and again the CRT, whereby in particular the geometric image distortions of the CRT are eliminated. In each location of the screen of the CRT, in which the light point is present, the brightness of the image point is calculated and immediately corrected. By the above described measures the effect of any distortion of the CRT is coupled out, whereby a sharper image is obtained. The part of the light of the CRT used for exposure is not weakened by the master. The process is intended primarily for the photographic copying of color slides.

16 Claims, 1 Drawing Sheet

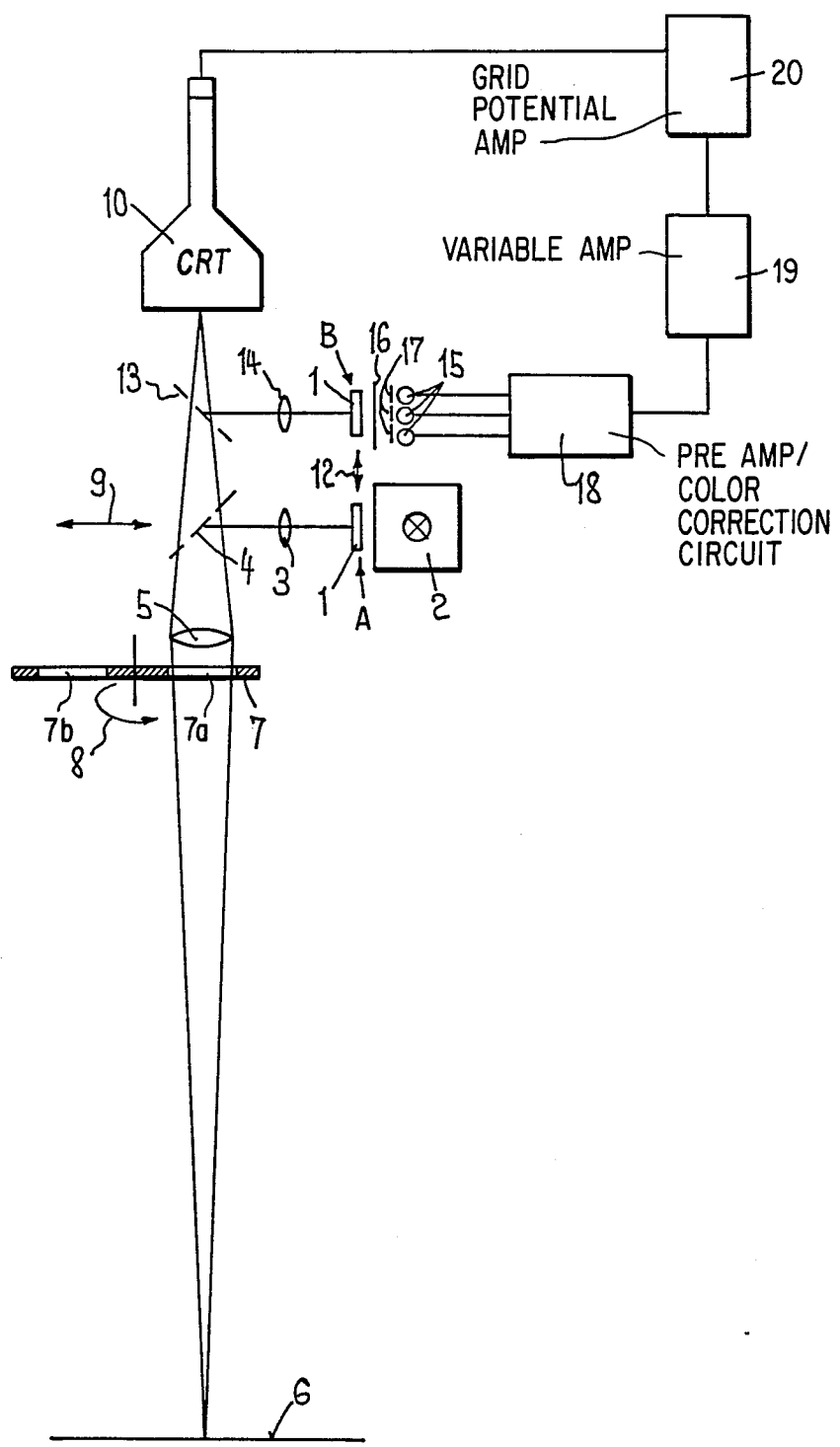

PROCESS AND APPARATUS FOR THE PREPARATION OF PHOTOGRAPHIC IMAGES FROM TRANSPARENT MASTERS

FIELD OF INVENTION

The present invention relates to a process and apparatus for the preparation of photographic images from transparent masters, and particularly for the preparation of photographic color images from transparent slides. More specifically, the invention relates to a process and apparatus for preparing such images wherein the transparent master in a first beam path, is reproduced on photographic material by means of a source of light and optical means and, in a second beam path is reproduced in a coincident manner on the photographic material for the purpose of color and contrast correction by means of a cathode ray tube controlled by an image measuring device and a computer unit as a mask. The process and the apparatus to carry out the process are primarily intended for the production of color prints from transparent slides.

A process and apparatus of this type is known from U.S. Pat. No. 3,934,081, which relates to a process with a combination exposure, wherein a sharp optical illumination of a conventional enlarging device is combined with a less sharp correction exposure from a cathode ray tube with high light intensity, i.e. the so called non-sharp masking process is used. The partial exposures must be coordinated with each other relative to their intensity so that a correctly exposed image is obtained. The process described in this patent and in U.S. Pat. No. 4,580,167 is based on the configuration of a conventional enlarging device. In the process according to these patents the master is transmission illuminated by a suitable source of light, for example a halogen lamp and reproduced by means of a principal objective lens on the photographic material. In a second beam path, deflected by means of partially reflecting mirrors from the first beam path, the partial beam impacts a television or video camera. The signals obtained for the transmission in blue, green and red from every image point of the master are corrected in an image computer and control the cathode ray tube, the beam deflection of which is synchronized with the television camera. The mask image produced on the screen of the cathode ray tube is superposed by means of an objective lens and a second deflecting mirror on the image optically exposed on the photographic material, thereby obtaining non-sharp masking.

In order to obtain a good image, it is necessary that the two partial images, i.e. the conventional optically produced and electronically produced images, coincide well over the entire area of the image, otherwise colored outlines appear in image locations in which different colored fields are bordering on each other. However, images produced by conventional cathode ray tubes and mentioned in the aforecited patents, contain distortions of image geometry which in combination with an optically produced image lead to the above mentioned coincidence errors. The electronic correction of such errors of image geometry is highly involved.

In contrast, it is the object of the present invention to provide a process and apparatus making it possible with simple means to neglect the effect of image distortion by the cathode ray tube on the quality of the image to be produced and to avoid the weakening of the light of the cathode ray tube used for the exposure, as the slide is not located in the exposing beam path. The process according to the invention attaining this object and an appropriate apparatus according to the invention are described hereinafter in detail and are set forth in the independent claims. Certain features according to a preferred embodiment of the invention are set forth in the dependent claims. According to the form of embodiment of claims 5–10, it is obtained additionally in an advantageous manner that the edge fall-off of an image exposed by a cathode ray tube by means of an objective lens on a photographic material is reduced.

In 2244 Research Disclosure No. 174 (1978.10) a color enlarging device operating with a cathode ray tube (CRT) is described. In this device a partially reflecting mirror deflects a portion of the light of the enlarging device in front of the objective lens into a side branch. Partially transmissive or dichroic mirrors and color filters divide this light into B, G and R, each of which is passed by means of an objective lens onto vidicon receiver tubes, whereon a reduced image of the master appears. A computer unit converts the vidicon output signals and controls the brightness of each image point on a CRT. The light of the CRT is superposed after passing through an objective lens by means of partially reflecting mirror on the light of the enlarging apparatus.

Vidicon tubes and CRT-s have nonlinear geometric image distortions. Their correction is very difficult and costly. Coincidence errors of the partial images must therefore be expected. The latter are avoided according to the present invention by the following means: only a single CRT is used, the light of which is split by a partially transmissive mirror into an exposure and a scanning branch. In the scanning branch the light initially passes through an objective lens, which reproduces the image of the CRT or respectively the image point written at any given moment on the CRT onto the master (transparent slide). After the slide, this light is passed onto three color filters (B, G, R) in a suitable manner (scattering disk, optical fiber bundle, crossed lens grating elements, dichroic beam splitter or prismatic light conduction bodies), said color filters being followed by photodetectors. The output signals of the photodetectors are passed after conversion and amplification in the sense of a feedback loop to the CRT control grid. This conversion, which effects a brightness correction for every image point, is rapid compared to image scanning. The correction is thus carried out prior to the scanning of the next image point. For this reason, the image geometry is determined by the slide only. No geometric distortion of the CRT grid has any effect.

U.S. Pat. No. 3,459,888 is further known relative to the state of the art. It concerns microfilm exposures of black-and-white documents. The documents are exposed by flash lamps. Previously, however, an illumination with incandescent lamps is effected, wherein image is received by a vidicon camera; it appears on a monitor. The operator may select a rectangular part of the image that is not to be copied. This part is overexposed by means of a CRT (fully blackened in the case of a negative-positive film).

A process is further known from U.S. Pat. No. 3,984,187 (DE-OS 24 08 019) for the scanning and recording of image masters, this process also operates with a CRT. However, in contrast to the present invention, it involves contrast correction only and no color correction.

In the forms of embodiment according to FIGS. 1, 3 and 4 both the principal exposure and the correction exposure is carried out exclusively with a CRT; a reduction in contrast is intended.

According to the form of embodiment shown in FIG. 2, an incandescent light is used for the principal exposure. The light of the CRT thus passes through the transparent master, at least for correction exposure. However, our calculations and experiments indicate that in the process a very substantial part of the already relatively low light intensity of the CRT is lost. This would not be acceptable for numerous photographic materials, as the exposure times would have to rise to several minutes (The requirement of a total exposure under 30 sec is attainable and is experimentally secured by the system according to the invention). This is possible in keeping with the invention, as the master is transmission illuminated in the measuring branch. The use of extremely high intensity CRT-s, for example projection tubes, would not constitute an advantageous alternative (life, price, cooling, spot size). No such tubes are mentioned in U.S. Pat. No. 3,984,187. If it is considered that a color slide may have maximum densities of 2.7 or more and that in transmission through a density of 2 approx. 99% and through a density of 3 as much as 99.9% of the light is absorbed, the weakness of the light according to U.S. Pat. No. 3,984,187 is clearly recognized as a significant deficiency.

In U.S. Pat. No. 4,394,089 and U.S. Pat. No. 3,961,366 similar devices with deficiencies similar to the aforementioned U.S. Pat. No. 3,934,081 and U.S. Pat. No. 4,580,167, are described. In these, and in further references, for example U.S. Pat. Nos. 4,344,699, 3,115,807 and CH 453,878, layouts are described in which the light of the CRT passes through the master prior to impacting the photographic material. However, the master absorbs so much light that either long exposure times are required, or high sensitivity photographic materials must be used. In U.S. Pat. No. 4,394,089, which mentions a low sensitivity photographic material, for this reason three projections CRT-s are provided for the contact copy, one each for blue, green and red.

BRIEF DESCRIPTION OF THE DRAWING

The invention will become more apparent from the following description with reference to the drawing. The single FIGURE schematically shows an example of embodiment of an apparatus according to the invention.

DETAILED DESCRIPTION OF A PREFERRED EMBODIMENT

For a conventional light-optical exposure a transparent master 1 is shown, for example a transparent slide, through which the light of an illuminating unit 2, which comprises for example a halogen lamp and copying filters or dichroic mirrors, such as those used in color enlarging devices. With the variable copying filters the gray balance may be set in the usual manner, so that gray fields present on the master are reproduced in neutral gray. The unit 2 may additionally contain a shutter to control the exposure time. It is also possible to actuate and deactivate the lamp. The master is reproduced or imaged on a color photographic material or photomaterial 6 by means of an auxiliary objective lens 3, a movable mirror 4 (arrow 9) and a principal objective lens 5. In the process the light passes through a filter wheel 7, which may be rotated in keeping with the arrow 8. The filter wheel has four openings, three of which contain the exposure filters blue, green or red, while the fourth opening is formed for optical exposure without a filter. Only two filters 7a and 7b of the three exposure filters are seen in the FIGURE. The auxiliary objective lens 3 has the function of adjusting the size of the image of the master to the size of the image on the screen of a CRT 10, so that both images have the same size on the plane with the photomaterial 6.

For electronic mask formation and exposure, the movable mirror 4 is removed according to the arrow 9 from the beam path. The screen image produced on the CRT 10 is reproduced or imaged on the photographic material 6 through the principal objective lens 5 and one of the three color filters of the filter wheel 7. The CRT is indicated schematically only and can be, e.g., a so-called flying spot CRT as recommended for Tele-Cine-applications by Litton Ind., Tempe, Ariz., U.S.A. Using such a CRT a high light yield is obtained. The transparent slide 1 is brought into the position indicated by the arrow B by means of suitable transport means 12. The screen image of the CRT 10 is reproduced by means of a partially reflecting mirror 13 and an objective lens 14 on the master 1 in position B. The light transmitted through the master is scattered on a scattering disk 16 and arrives through the color filter 17 (blue, green, red) on photosensitive elements 15 to produce color-related output signals for further processing as described below. If sensitive photodetectors are used as the photosensitive elements, the portion of light for this measuring branch may be relatively small. As a rule, photomultipliers or photodiodes are used. The uniform distribution of the light on the photosensitive elements 15 may also be obtained instead of a scattering disk, by a bundle of optical fibers, dichroic beam splitters or prismatic light conduction bodies or other optical elements. The signals of the photodetectors 15 are processed to produce CRT control signals in a known manner in electronic units 18, 19 and 20 and are conducted to the control grid of the CRT 10.

A comparison of the example of embodiment according to the FIGURE with known layouts shows that the straight line beam path of the CRT 10 passes through the principal objective lens 5 onto the color photomaterial 6 and the optical beam path from the light source 2 through the principal objective lens 5 to the colorphoto plate 6 through a deflection mirror 4, while otherwise the straight beam path passes from the light source to the colorphoto plate. In principle, black/white photographic plates may also be used.

The electronic unit 18 contains preamplifiers for the photodetectors and a color correction circuit. The undesirable secondary color densities of the colorants of the master and/or the photomaterial 6 are thereby compensated. These materials comprise after chemical processing and development the colorants yellow, purple (magenta) and blue-green (cyan). If for example a saturated blue is to be reproduced, it is an interference that magenta and cyan colorants are absorbing not only green and red light respectively, but also some blue light. The undesirable blue absorbing components are subtracted from the blue signal proper. These considerations are also applied to the other two fundamental colors and, as is known, the result is a 3 by 3 matrix with six coefficients, corresponding to the six secondary color densities of the three reproduction colorants. If the apparatus is used only to alter the contrast of black-and-white images or color images, naturally no matrix unit is required and one single photodetector suffices. The electronic unit 19 contains a contrast correction, i.e. a variable amplifier, which lowers (negative feedback) or increases the contrast, as desired. Nonlinear corrections of the reproduction function may also be provided. The electronic unit 20 contains the grid potential amplifier for the CRT 10. The units 18 and 19 may be laid out on the basis of analog computers, as is the practice in present television technology, or digitally, in which case at the onset an analog-digital converter and at the end a digital-analog converter must be provided. Optionally, not shown, a timer may be used, which any time a mask image has been written completely once or several times on the CRT 10, receives a pulse and controls the motion of the mirror 4, the filter wheel 7 and the master 1. The electronic units 18 and 19 may operate with linear, transmission-proportional or logarithmic signals proportional to optical density. They may also contain circuits to increase edge sharpness, as known in television technology (edge enhancement).

It is seen from the above that in this manner coincidence errors between the optically and electronically produced images may be completely avoided. At any point of the screen of the CRT at which the point of light may be instantaneously located, its correction, i.e. the brightness of the image point, is immediately calculated and adjusted. The location and thus the size of the correction is determined by the master in position B. The linearity or distortion of the lines and the grid on the screen is thus irrelevant and the system behaves as if the master would be reproduced optically on the photomaterial. It is further seen from the description of the process and the apparatus that the enormous loss of light which is incurred when the light of the CRT exposing the photomaterials must pass through the master, as is the case in other apparatuses of the state of the art, may be avoided. In addition in the course of the point-by-point scanning with the simultaneous point exposure the storage of the image formation as a whole, as practiced in other known devices, is eliminated.

It is further seen from the description that the exposures are carried out sequentially, i.e. initially the sharp imaging of the master is effected by means of the illuminating unit 2 and the principal objective lens 5, wherein only a first part of the total exposure required for the correct exposure of a color image is applied, and subsequently the second part of the total exposure is carried out by means of the CRT, wherein again sequentially first, in an arbitrary order, the blue filter, then the green filter and finally the red filter are inserted into the beam path and simultaneously with the change of filter, the matrix output signal is switched to green or red, respectively, but with the three additive partial exposures being chosen relative to their strength and duration in a manner such that the gray balance of the image exposed on the color photomaterials is preserved.

The dynamic behavior of the correction loop, consisting of the CRT 10, the mirror 13, the objective lens 14, the master 1 in position B, the scatter element 16, the filters 17, the photodetectors 15 and the electronics 18–20, must further be taken into consideration. This requires that the CRT have a phosphorus layer with a rapid fading time. Phosphoruses with a fading time, i.e. a decline of the light intensity to 10% after exposure to electron beam irradiation, of 0.1 microsec are available, they are used in the so-called "flying spot" CRT's for film scanning for television purposes. There are also no problems in the case of the photodetectors 15 relative to speed. It is possible for example to base a rough estimate on that one microsec is available for one image point, i.e. that a grid of 1000 lines with 1000 image points each, is written in one second. The computing operations in the units 18 and 19 must take place in this example in less than one microsec. This is possible with commercially available elements, as in comparable television layouts per second 25 × approx. 400,000 image points, i.e. about $10 \times 10^6$ image points are reproduced. The elements presently on the market thus operate about ten times faster as needed here.

As mentioned above, the edge fall-off correction is important in order to obtain a correct and good image. This may be obtained for example electronically by means of an amplifier, which controls the beam of the CRT as a function of the distance of the light spot from the center of the screen of the CRT. The necessary signals are obtained from the deflection potentials.

Edge corrections by optical means are also possible, wherein a transparent thin sheet or disk with a gray coloring and absorbing more strongly in the center of the image than at the edges, is placed over the screen of the CRT.

Another method of compensation of edge losses consists of the application of nonlinear grids, for example Lissajous figures. In order to obtain them, two alternating voltages are used as the deflecting voltages for the x and y deflection of the beam, the frequencies of which preferably correspond to two successive prime numbers. The line density is higher at the edge of the image. To avoid overcorrections, the edge of the grid is not used, i.e. it either is suppressed electronically or written beyond the edge of the utilizable image field of the CRT. Calculations have shown that the $\cos^4 \alpha$ decline may be compensated in this manner, if approximately 75% of the width and height of the grid image is utilized, with the angle $2\alpha$ corresponding to the opening of the light cone from the light spot on the screen to the aperture of lens 5.

A further method for edge fall-off compensation consists of drawing a linear rectangular grid, but varying the writing velocity of the electron beam as a function of the distance of the light point on the screen of the CRT from the center of the image, so that constant brightness is obtained on the plane of the photomaterial without image modulation. The beam thus moves slower at the edge of the image than in its center.

If a grid with thousand lines per image height is used, and then combined with the partial optical exposure, the grid lines on the finished image are difficult to recognize, particularly if a Lissajous grid is employed. There are, however, processes whereby the line structure may be suppressed for linear rectangular grids also. Thus the grid may be written two or three times, while insuring electronically that the grid lines of the second and third grid are written between those of the first grid.

The principles, preferred embodiments and modes of operation of the present invention have been described in the foregoing specification. The invention which is intended to be protected herein, however, is not to be construed as limited to the particular forms disclosed, since these are to be regarded as illustrative rather then restrictive. Variations and changes may be made by those skilled in the art without departing from the spirit of the invention.

What is claimed is:

1. A process for the production of photographic images of transparent masters, comprising the steps of:
   producing a first image of the transparent master on photographic material by means of a light source and optical means in a first beam path;
   producing a second image of the transparent master on said photographic material coincident with said first image, for color and contrast correction, by means of a CRT in a second beam path, the CRT being controlled to produce said second image by a feedback loop comprising the CRT, the master, an image measuring means, a computer unit responsive to said image measuring means and again the CRT, whereby the geometric image distortions of the CRT are compensated and wherein in each location in which the light point is momentarily present the brightness of the image point is calculated and immediately corrected.

2. A process according to claim 1 wherein the first beam path is from the light source to the photographic material by way of an auxiliary objective lens and a deflecting mirror that is removable from the beam path, and the second beam path originates at the CRT and follows a straight line to the photographic material, both beam paths including a principal objective lens, and wherein the feedback loop includes a feedback loop beam path coupled from the second beam path by means of a partially reflecting mirror and extending from the CRT, through the master, to the image measuring means.

3. A process according to claim 2 wherein the screen image of the CRT passes through the partially reflecting mirror and an objective lens to the master, is divided and then conducted through three color filters of the colors blue, green and red to the image measuring means to produce blue, green and red output signals, wherein the blue, green and red output signals are processed in the computer unit to produce control signals to control the screen image of the CRT.

4. A process according to claim 2 wherein the production of the first and second images on the photographic material is carried out sequentially, wherein initially the photographic material is exposed to the first image of the master in a first position and the photographic material is exposed to the second image of the master in a second position, the exposure to the second image being effected following the removal of the deflecting mirror from the second beam path and being carried out sequentially relative to the three base colors, the color exposures being selected in strength and duration so that the gray balance of the image exposed on the photographic material is preserved.

5. A process according to claim 1 wherein an edge fall-off correction is effected for the screen image of the CRT.

6. A process according to claim 3 wherein the production of the first and second images on the photographic material is carried out sequentially, wherein initially the photographic material is exposed to the first image of the master in a first position and the photographic material is exposed to the second image of the master in a second position, the exposure to the second image being effected following the removal of the deflecting mirror from the second beam path and being carried out sequentially relative to the three base colors, the color exposures being selected in strength and duration so that the gray balance of the image exposed on the photographic material is preserved.

7. A process according to claim 6 wherein an edge fall-off correction is effected for the screen image of the CRT.

8. A process according to claim 5 wherein, for the edge fall-off correction, a gray, nonlight-scattering disk, colored stronger in the center than at the edges, is placed on the screen of the CRT.

9. A process according to claim 5 wherein, for the edge fall-off correction, the brightness or velocity of the light spot of the CRT is controlled as a function of its distance from the center of the image.

10. A process according to claim 5 wherein, for the edge fall-off correction, nonlinear grids, in particular Lissajous FIGURES, are used.

11. Apparatus for preparation of photographic images from a transparent master comprising:
    an optical exposure unit including a lamp and copying filters, auxiliary optical means, and a deflecting mirror all in a first, light-optical beam path, the deflecting mirror being selectively removable from the first beam path;
    a CRT, a partially reflecting mirror and a set of color filters all in a second beam path, both beam paths being arranged so that they are directed by same principal optical objective lens onto a photographic material; and
    a feedback loop for controlling the CRT comprising the partially reflecting mirror, the master and optical means including a beam splitter arranged to receive light from said partially reflecting mirror, color filters each with an associated photodetector for producing color-related output signals, and signal processing means for processing said color-related output signals to produce CRT control signals.

12. The apparatus of claim 11 wherein the first beam path passes through said set of color filters.

13. The apparatus of claim 11 wherein said signal processing means includes means for edge fall-off correction of the image produced by said CRT.

14. The apparatus of claim 11 including a gray, nonlight-scattering disk on the screen of the CRT, the disk being colored stronger in the center than at the edges to produce an edge fall-off correction of the image produced by the CRT.

15. The apparatus of claim 11 wherein said signal processing means comprises a color correction circuit for correcting each primary color for undesirable secondary absorbances of the colorants of the master or the photographic material.

16. The apparatus of claim 15 wherein said set of filters and associated photodetectors comprise a color filter and an associated photodetector for each primary color, said color correction circuit comprising a color correction circuit for each primary color including means for subtracting an undesirable color component from the color-related output signal for each primary color.

* * * * *